US008049356B2

(12) United States Patent  
Chervin et al.

(10) Patent No.: US 8,049,356 B2  
(45) Date of Patent: Nov. 1, 2011

(54) WAVE ENERGY CONVERSION DEVICE

(75) Inventors: Christophe Chervin, Neydens (FR); Anthony Loth, Saint-Julien-En-Genevois (FR)

(73) Assignees: E. I. DuPont de Nemours and Company, Wilmington, DE (US); Technology From Ideas, Waterford (IE)

( * ) Notice: Subject to any disclaimer, the term of this patent is extended or adjusted under 35 U.S.C. 154(b) by 0 days.

(21) Appl. No.: 12/954,528

(22) Filed: Nov. 24, 2010

(65) Prior Publication Data  
US 2011/0068578 A1     Mar. 24, 2011

Related U.S. Application Data

(63) Continuation of application No. PCT/US2009/058930, filed on Sep. 30, 2009.

(60) Provisional application No. 61/195,673, filed on Oct. 9, 2008.

(51) Int. Cl.  
*F03B 13/10* (2006.01)  
*F03B 13/12* (2006.01)  
*H02P 9/04* (2006.01)  
*F03B 13/20* (2006.01)

(52) U.S. Cl. .......................................... 290/53; 60/500

(58) Field of Classification Search .................. 290/53; 60/500  
See application file for complete search history.

(56) References Cited

U.S. PATENT DOCUMENTS

| 882,883 | A | * | 3/1908 | Hillson | 60/500 |
| 917,411 | A | * | 4/1909 | Oasella et al. | 60/500 |
| 1,018,678 | A | * | 2/1912 | Nelson | 290/4 D |
| 1,078,323 | A | * | 11/1913 | Trull | 417/332 |
| 2,951,450 | A | * | 9/1960 | Fisher | 417/273 |
| 3,583,821 | A | * | 6/1971 | Shaub et al. | 408/72 R |
| 3,598,505 | A | * | 8/1971 | Greene et al. | 417/220 |
| 3,758,788 | A | * | 9/1973 | Richeson | 290/42 |
| 3,961,490 | A | * | 6/1976 | Corgnet | 405/202 |
| 3,961,863 | A | * | 6/1976 | Hooper, III | 417/334 |
| 4,077,213 | A | * | 3/1978 | Hagen | 60/500 |
| 4,098,084 | A | * | 7/1978 | Cockerell | 60/500 |
| 4,105,368 | A | * | 8/1978 | Waters | 417/53 |
| 4,118,932 | A | * | 10/1978 | Sivill | 60/500 |
| 4,210,821 | A | * | 7/1980 | Cockerell | 290/53 |
| 4,258,270 | A | * | 3/1981 | Tornkvist | 290/53 |
| 4,313,716 | A | * | 2/1982 | Jones | 417/331 |
| 4,319,454 | A | * | 3/1982 | Lucia | 60/506 |
| RE31,111 | E | * | 12/1982 | Hagen | 60/500 |
| 4,392,349 | A | * | 7/1983 | Hagen | 60/500 |
| 4,421,461 | A | * | 12/1983 | Hicks et al. | 417/53 |
| 4,480,966 | A | * | 11/1984 | Smith | 417/332 |
| 4,681,816 | A | * | 7/1987 | Hashimoto et al. | 428/463 |

(Continued)

FOREIGN PATENT DOCUMENTS

JP       S54-105630 A       8/1979

(Continued)

OTHER PUBLICATIONS

International Search Report /Written Opinion, dated May 18, 2010, in PCT/US2009/058930, from which this application claims priority.

*Primary Examiner* — Pedro J Cuevas

(57) ABSTRACT

Wave energy conversion device (WEC) comprising a means for damping the reactionary motion of a wave energy conversion device to wave motion, which is a cylindrical bellowed elastomeric member that acts under axial compression.

12 Claims, 6 Drawing Sheets

U.S. PATENT DOCUMENTS

| | | | | | |
|---|---|---|---|---|---|
| 4,684,815 | A | * | 8/1987 | Gargos | 290/53 |
| 4,686,377 | A | * | 8/1987 | Gargos | 290/53 |
| 4,742,241 | A | * | 5/1988 | Melvin | 290/53 |
| 4,781,023 | A | * | 11/1988 | Gordon | 60/506 |
| 4,848,980 | A | * | 7/1989 | Broussard | 408/67 |
| 4,851,704 | A | * | 7/1989 | Rubi | 290/53 |
| 4,921,375 | A | * | 5/1990 | Famulari | 408/67 |
| 4,955,984 | A | * | 9/1990 | Cuevas | 408/67 |
| 5,132,550 | A | | 7/1992 | McCabe | 290/53 |
| 5,158,286 | A | * | 10/1992 | Soong | 473/522 |
| 5,169,146 | A | * | 12/1992 | Soong | 473/522 |
| 5,292,210 | A | * | 3/1994 | Nowick | 408/67 |
| 5,653,561 | A | * | 8/1997 | May | 408/67 |
| 5,688,082 | A | * | 11/1997 | Richardson | 408/67 |
| 5,904,453 | A | * | 5/1999 | Gavia | 408/67 |
| 6,079,078 | A | * | 6/2000 | Byington | 15/339 |
| 6,109,029 | A | * | 8/2000 | Vowles et al. | 60/398 |
| 6,164,881 | A | * | 12/2000 | Shono | 409/137 |
| 6,476,511 | B1 | * | 11/2002 | Yemm et al. | 290/42 |
| 6,930,406 | B2 | * | 8/2005 | Montgomery | 290/42 |
| 6,951,439 | B2 | * | 10/2005 | Arich | 408/67 |
| 7,175,371 | B2 | * | 2/2007 | Vidal | 408/1 R |
| D542,312 | S | * | 5/2007 | Skradski et al. | D15/138 |
| D542,313 | S | * | 5/2007 | Skradski et al. | D15/138 |
| 7,298,054 | B2 | * | 11/2007 | Hirsch | 290/42 |
| 7,305,823 | B2 | * | 12/2007 | Stewart et al. | 60/495 |
| 7,315,092 | B2 | * | 1/2008 | Cook | 290/53 |
| 7,385,301 | B2 | * | 6/2008 | Hirsch | 290/42 |
| 7,443,045 | B2 | * | 10/2008 | Yemm | 290/42 |
| 7,443,047 | B2 | * | 10/2008 | Ottersen | 290/53 |
| D588,893 | S | * | 3/2009 | Radich | D8/70 |
| D590,227 | S | * | 4/2009 | Yun | D8/70 |
| D593,389 | S | * | 6/2009 | Clayton | D8/70 |
| 7,579,704 | B2 | * | 8/2009 | Steenstrup et al. | 290/53 |
| 7,594,780 | B2 | * | 9/2009 | Bull | 405/195.1 |
| 7,629,703 | B2 | * | 12/2009 | Storbekk | 290/53 |
| 7,632,041 | B2 | * | 12/2009 | Jean et al. | 405/76 |
| 7,694,513 | B2 | * | 4/2010 | Steenstrup et al. | 60/498 |
| 7,740,086 | B2 | * | 6/2010 | Bleicher et al. | 173/198 |
| 7,759,814 | B2 | * | 7/2010 | Oigarden | 290/53 |
| 7,808,120 | B2 | * | 10/2010 | Smith | 290/42 |
| 7,956,478 | B2 | * | 6/2011 | Steenstrup | 290/53 |
| 2006/0090842 | A1 | * | 5/2006 | Chervin | 156/245 |
| 2007/0261404 | A1 | * | 11/2007 | Stewart et al. | 60/495 |
| 2007/0282052 | A1 | * | 12/2007 | Bhowmick et al. | 524/500 |
| 2008/0272529 | A1 | * | 11/2008 | Chervin et al. | 267/201 |
| 2009/0015013 | A1 | * | 1/2009 | Jaer | 290/53 |
| 2009/0146529 | A1 | | 6/2009 | Wendt et al. | 310/317 |
| 2009/0206608 | A1 | * | 8/2009 | Koola et al. | 290/53 |
| 2009/0224548 | A1 | * | 9/2009 | Oigarden | 290/53 |
| 2010/0101474 | A1 | * | 4/2010 | McEvoy et al. | 114/230.24 |
| 2010/0308589 | A1 | * | 12/2010 | Rohrer | 290/53 |
| 2011/0012358 | A1 | * | 1/2011 | Brewster et al. | 290/53 |
| 2011/0031751 | A1 | * | 2/2011 | Yang et al. | 290/53 |
| 2011/0061377 | A1 | * | 3/2011 | Preftitsis et al. | 60/500 |
| 2011/0062713 | A1 | * | 3/2011 | Ardoise et al. | 290/53 |

FOREIGN PATENT DOCUMENTS

JP     02880757 B2     4/1999

\* cited by examiner

WAVE ENERGY CONVERSION DEVICE

CROSS REFERENCE TO RELATED APPLICATIONS

This application claims priority to PCT/US09/58930, filed 30 Sep. 2009 and currently pending, which claims priority from U.S. Provisional App. No. 61/195,673, filed 9 Oct. 2008 and now expired.

FIELD OF THE INVENTION

The present invention relates to devices for wave energy conversion and, in particular, to a damper and a damping structure for a wave energy conversion device.

BACKGROUND OF THE INVENTION

Increasing concerns regarding traditional energy sources have prompted investigation of alternative, renewable sources of energy. Energy from the power of ocean waves is a renewable energy source, from which considerable quantities of electricity can be produced.

Wave energy refers to the energy of ocean surface waves and the capture of that energy for the purpose of electricity generation. In general, the larger the wave, the more energy it contains, and therefore, the more energy that can be obtained from it. Specifically, the amount of energy which may be obtained from waves is determined by wave height, wave speed, wavelength, and water density.

Several types of wave energy conversion devices (WEC) may be used to capture wave energy. All of these devices work on a similar principle. The wave force acts on an absorbing member, which is coupled with a second member capable of relative motion to the absorbing member. The second member can also be an absorbing member. The wave force results in motion of the absorbing member relative to the second member, and the movement can be converted into electrical energy.

There are several disadvantages associated with known energy absorbing devices. Extreme waves (i.e. exceptionally large waves with respect to the average current wave state, or rapidly changing waves) can occur during otherwise benign wave states. Such large waves can cause an excessive force to be exerted on the linkage or coupling between the absorbing member and the second member. This can result in breakage of the coupling, particularly in devices with no natural damping, such as linear energy converters. Accordingly, these devices have poor survivability, even in normal wave conditions.

A further disadvantage associated with known wave energy converters is poor efficiency of energy capture. Typical devices are capable of capturing wave energy only over a relatively narrow range of wave frequencies and energy states. While more advanced devices can tune their response to enable them to optimise energy capture from any given wave state, such slow tuning usually only delivers a good response to the average power spectrum of that wave state. Few devices can respond rapidly enough to the individual frequencies within a single sea state.

There is a need for a wave energy conversion device (WEC) having damping means enabling the WEC to survive extreme waves, and also to respond rapidly to wave frequency spectrums, so as to improve survivability and/or improve the energy extraction efficiency.

SUMMARY OF THE INVENTION

In a first aspect, the invention provides a wave energy conversion device comprising:

(a) a first member capable of movement in response to a wave;
(b) a second member mechanically coupled to the first member and capable of relative motion with respect to the first member under the influence of a wave, the relative motion being converted into electrical energy; and
(c) at least one damping means capable of damping the relative motion under conditions of extreme waves;

wherein the damping means is a cylindrical bellowed elastomeric member which acts under axial compression.

In another aspect of the invention, the damping means in the wave energy conversion device described above is hollow. In yet another aspect of the invention, the damping means of the wave energy conversion device described above is a hollow cylinder having bellows in its side walls.

In one embodiment of the invention described above, the damping means is made of an elastomeric material that is a thermoplastic material having the following characteristics in use:

(a) an elongation at break, measured according to ISO 527-1/-2, higher than 15% between −20° C. and +60° C.,
(b) a tensile stress at yield, measured according ISO 527-1/-2, between 5 and 100 MPa, and
(c) a tensile modulus of elasticity (measured according ISO 527-1/-2) below 20000 MPa.

In another embodiment of the wave energy conversion device described above, the damping means is made of a copolyetherester or copolyesterester, which are copolymers that have a multiplicity of recurring long-chain ester units and short-chain ester units joined head-to-tail through ester linkages, said long-chain ester units being represented by formula (A):

and said short-chain ester units being represented by formula (B):

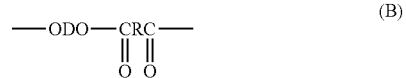

wherein:
G is a divalent radical remaining after the removal of terminal hydroxyl groups from poly(alkylene oxide)glycols having preferably a number average molecular weight of between about 400 and about 6000;
R is a divalent radical remaining after removal of carboxyl groups from a dicarboxylic acid having a molecular weight of less than about 300; and
D is a divalent radical remaining after removal of hydroxyl groups from a diol having a molecular weight preferably less than about 250; and wherein said copolyetherester(s) preferably contain(s) from about 15 to about 99 wt-% short-chain ester units and about 1 to about 85 wt-% long-chain ester units.

In yet another embodiment of the wave energy conversion device described above, the damping means is made from a thermoplastic polyurethane consisting of a linear segmented block copolymer composed of a hard segment comprising a first diisocyanate and a short chain glycol, and a soft segment comprising a second diisocyanate and a long chain polyol, as represented by formula (C):

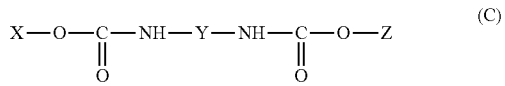

wherein:
X represents the hard segment comprising the first diisocyanate and a short-chain glycol;
Z represents the soft segment comprising the second diisocyanate and the long-chain polyol; and
Y represents the residual group of the diisocyanate compound of the urethane bond linking the X and Z segments.

In yet another embodiment of the wave energy conversion device described above, the damping means is made from a thermoplastic polyamide block copolymers consisting of linear saturated aliphatic polyamide segments and flexible polyether or polyester soft segment with both ether and ester linkages as represented by the general formula (D):

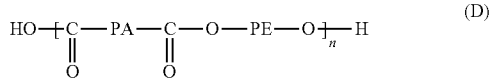

wherein:
PA represents a linear saturated aliphatic polyamide sequence; and
PE represents a polyoxyalkylene sequence formed from a moiety selected from the group consisting of linear aliphatic polyoxyalkylene glycols with ether, linkages, polyoxyalkylene glycols with ester linkages, polyoxyalkylene glycols with ether and ester linkages, branched polyoxyalkylene glycols with ether linkages, branched polyoxyalkylene glycols with ester linkages, branched polyoxyalkylene glycols with ether and ester linkages, long-chain polyol with ether linkages, long-chain polyol with ester linkages, long-chain polyol with ether and ester linkages, mixtures thereof, copolyethers derived therefrom, and copolyesters derived therefrom.

In yet another embodiment of the wave energy conversion device described above, the damping means is made from a thermoplastic vulcanizate. In another embodiment of the wave energy conversion device described above, the damping means is made from a thermoplastic polyolefinic elastomer. In yet another embodiment of the wave energy conversion device described above, the damping means is made from a styrenic thermoplastic elastomer. In yet another embodiment of the wave energy conversion device described above further comprises a non-engaged space at one or both ends of the damping means, whereby the damping means is not engaged within a limited range of relative motion of the first and second members. In another embodiment of the wave energy conversion device described above, the damping means is protected in a housing, and wherein the housing provides a non-engaged space, whereby the damping means is not engaged within a limited range of relative motion of the first and second members.

BRIEF DESCRIPTION OF THE DRAWINGS

The WEC and damping means described herein are further illustrated by the accompanying drawings, wherein.

DETAILED DESCRIPTION OF THE INVENTION

Figure 1:
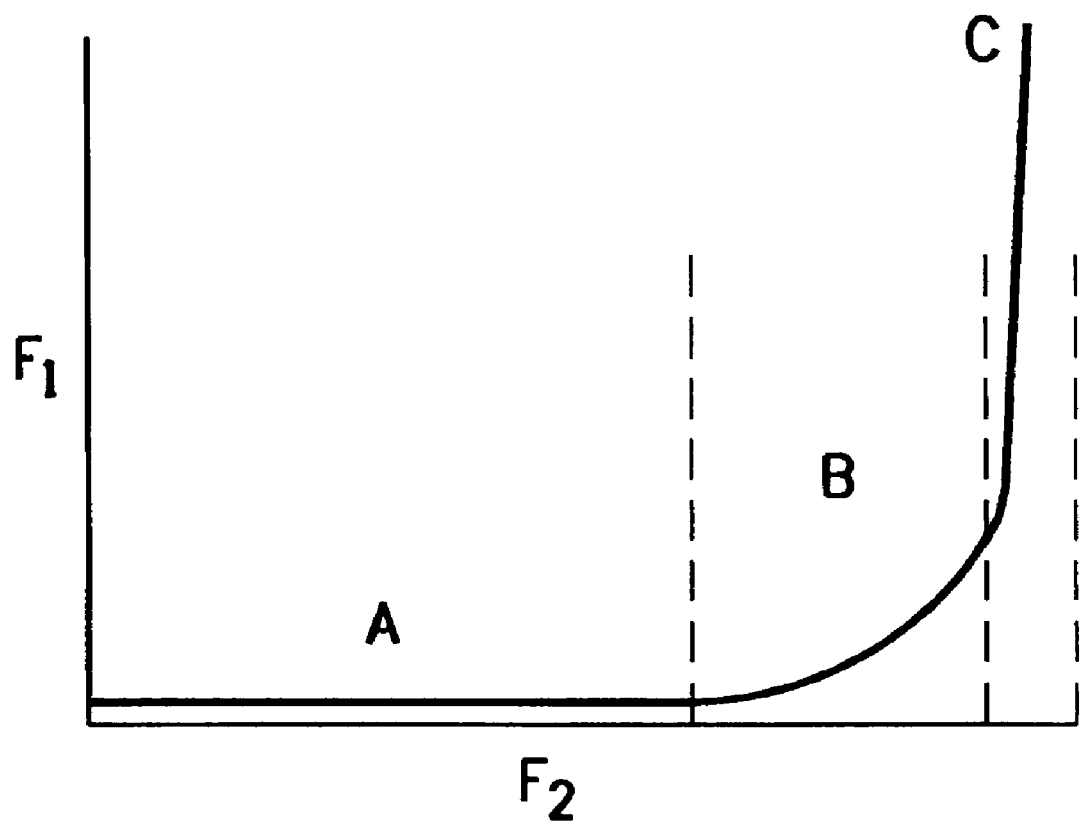
FIG. 1 is a graph showing applied force (F2) versus counter force (F1) for a material having a reversible non-linear stress strain response. Region A of FIG. 1 shows the ideal response under normal wave conditions, region B shows the ideal response under extreme conditions, and region C shows the ideal response when the conditions become so extreme that a protective function is necessary.

The inventors have found that a WEC having damping means that is a cylindrical bellowed elastomeric member which acts under axial compression (i.e. compressive forces acting in the longitudinal axis of the damping means) is particularly advantageous in surviving extreme waves and in improving energy extraction by improving response to the wave frequency spectrum.

The first member is typically a buoyant form ("float") that rises and falls with the motion of a wave, in order to maintain its flotation level. Such a float does not need to reside on the sea surface itself, but may substantially reside below the surface at a level where wave motion nevertheless occurs.

The second member may be tethered or fixed to the sea-bed or another stationary point, or it may be movable, as long as it can undergo relative motion with respect to the first member, under the influence of a wave. For example, the member may be movable but have sufficient inherent inertia to reduce its movement by wave motion, relative to the first member, thus resulting in a large movement of the first member and a lesser movement of the second member. Alternatively, the member may be tuned to a different frequency response to the first member.

The second member should be sufficiently resistant to wave motion such that wave motion causes relative movement between the second member and the first member of the WEC. The second member may comprise any structure capable of providing sufficient inertia. Such inertia may, for example, be provided by a raft-like structure of interconnected WEC devices. Alternatively, the inertia may be provided by a single rigid floating superstructure, acting as the second member for a plurality of WEC devices in a wave farm, the superstructure having a length much greater than the wavelength of the waves to obtain sufficient inertia.

In some embodiments, the first member and the second member exhibit different frequency responses to wave motion, causing relative motion therebetween when waves are incident upon them. In these embodiments, both the first and second members may be first members of the WEC device.

The first member is coupled to the second member in such a way that electrical energy can be generated from the relative motion between the first member and the second member. The coupling means comprises a power take off device to convert relative motion between the first member and the second member into electrical energy. The power take off device may be, for example, a linear electric generator.

The damping means is a cylindrical bellowed elastomeric member which limits the relative displacement of the first and second members. The bellows and the elastomeric material itself compress axially under the application of force, resulting in a non-linear response, such that the force required to compress the damping means increases slowly in the beginning of the compression and more steeply as the degree of compression increases as shown in the stress-strain curve in FIG. 1. The damping means may be a solid cylinder; however, preferably the damping means takes the form of a hollow cylinder or tube, having bellows in its side walls.

The terms "cylinder" and "cylindrical" as used herein include not only tubes of constant average cross-sectional circumference as one moves along the damping means in the axial direction, but also cylinders with changing cross-sectional circumference as one moves along the damping means in the axial direction, such as cone-shaped cylinders and truncated cones. In a preferred embodiment, the damping means is in the form of a truncated hollow cone, having circumferential bellows in the side walls (i.e. the average cross-sectional circumference of the bellows increases as one moves axially along the damping means). Alternatively, the damping means may be in the form of a hollow tube having circumferential bellows in the side walls (i.e. the average cross-sectional circumference of the bellows does not substantially increase as one moves axially along the damping means). The terms also include such shapes having non-circular cross-sections, for example, oval cross-sections or polygonal cross-sections (e.g. square, rectangular, hexagonal, octagonal, etc.) Non-hollow cylinders are also included.

Figure 2:
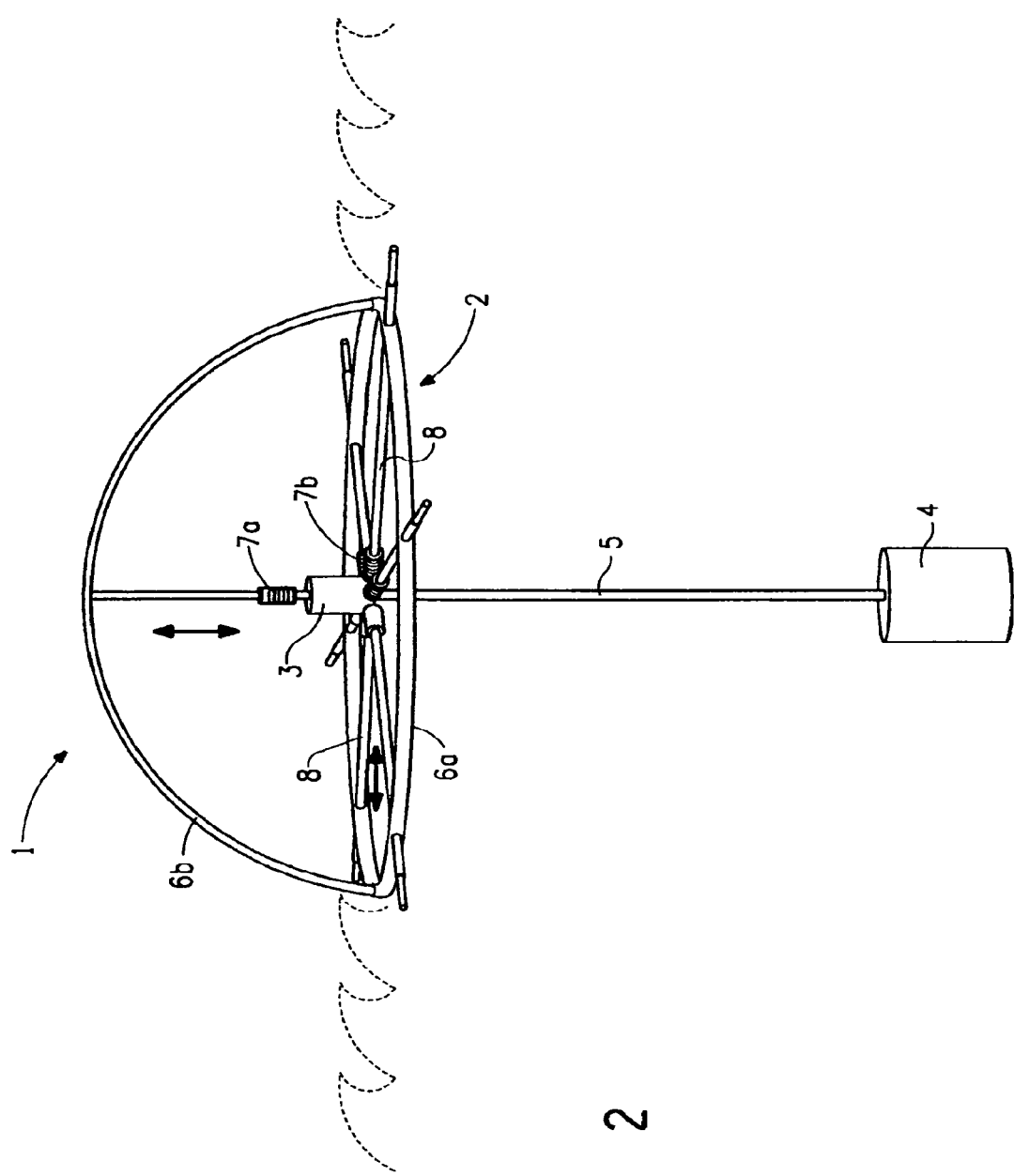
FIG. 2 is a perspective view of a wave energy conversion device comprising a damping structure according to an embodiment of the invention.
Figure 7:
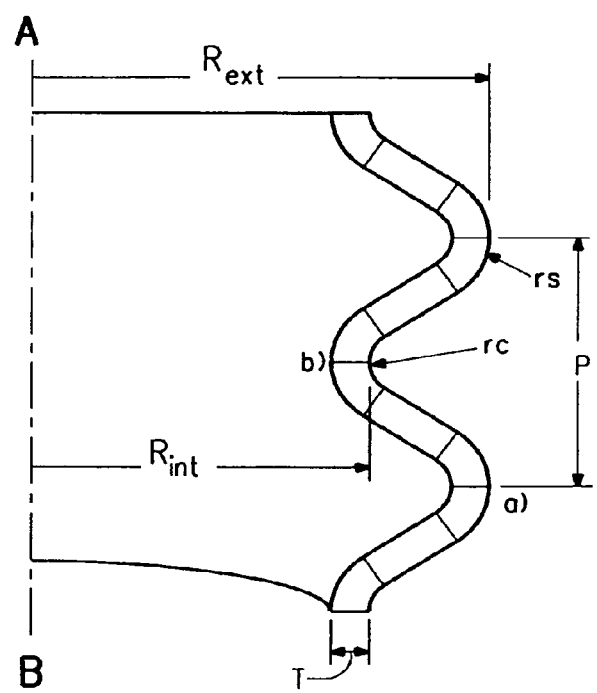
FIG. 7 is a schematic broken view of a damping means comprising all parameters describing the damping means. Line A-B designates the symmetry axis of the damping means, T designates the thickness, P designates the pitch, a) designates a peak, b) designates a valley, Rint designates the diameter of the valley, Rout designates the diameter of the peak, rc designates the fillet radius at minimum outer diameter of bellows, and rs designates the fillet radius at maximum outer diameter of bellows.

It is also possible to vary the damping means by varying the wall thickness of the damping means (FIG. 7, T), varying the ratio of the diameter of the peaks to the diameter of the valleys by means of varying the diameter/radius of the peaks (FIG. 7, Rext) and diameter/radius of the valleys (FIG. 7, Rint), by varying the number of bellows/convolutes, by varying the pitch (FIG. 7, P) or by varying the fillet radius at minimum outer diameter of bellows (FIG. 7, rc) and the fillet radius at maximum outer diameter of bellows (FIG. 2, rs). The damping means can comprise circumferential corrugations, bellows or convolutes all along its length or can comprise corrugations, bellows or convolutes being interrupted by smooth regions.

Figure 6:
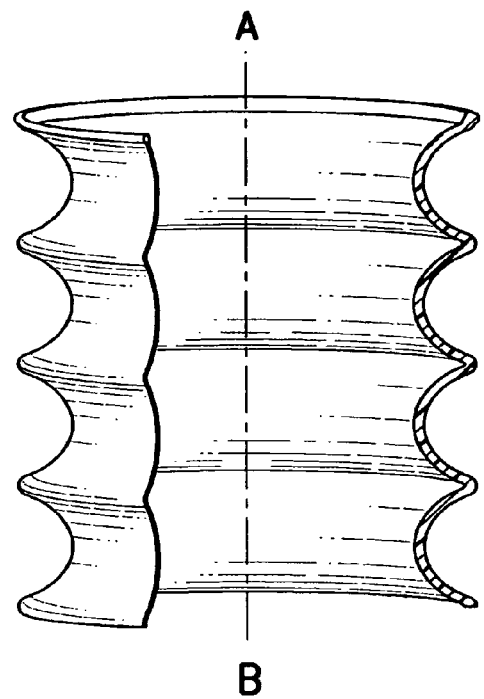
FIG. 6 is a schematic broken view of a damping means. Line A-B designates the symmetry axis of the damping means.

In a preferred embodiment, a damping means for use in a wave energy conversion device according to the invention has the following relative dimensions: P=P, Rext=4P to 5.5P, preferably 4.8P, T=0.1P to 0.5P, preferably 0.2P, rc=0.08P to 0.1P, preferably 0.083P, rs=0.25P to 0.4P, preferably 0.3P (defined in terms of FIGS. 6 and 7).

The damping means may be designed such that there is a range of relative motion between the first and the second member for which the damping means is not engaged, e.g. by provision of a space between the end of the damping means and the body against which it acts, such as the first and second members. This permits unhindered relative motion of the first and second members within a limited range. Once this range is exceeded (e.g. in high sea states), the ends of the damping means are engaged, and compressive damping begins.

The damping means is made from an elastomeric material, which may be thermoplastic or thermoset. Preferably it is made from thermoplastic material, as this facilitates production and reduces production costs. A preferred elastomeric material is a thermoplastic material having the following characteristics in use:

(a) an elongation at break higher than 15% between −20° C. and +60° C., preferably higher than 50%, measured according to ISO 527-1/-2 with a specimen type 1A, a speed of testing of 5 mm/min, an ambient temperature of 23° C. and a relative humidity of 50%;

(b) a tensile stress at yield between 5 and 100 MPa, measured according ISO 527-1/-2 with a specimen type 1A, a speed of testing of 5 mm/min, an ambient temperature of 23° C. and a relative humidity of 50%; and (c) a tensile modulus of elasticity below 20000 MPa (measured according ISO 527-1/-2 with a specimen type 1A, a speed of testing of 5 mm/min, an ambient temperature of 23° C. and a relative humidity of 50%, preferably between 25 MPa and 1200 MPa, most preferably between 100 and 600 MPa.

The elastomeric properties of the damping means are achieved not only by virtue of the elastomeric properties of the elastomeric material itself, but also by the design of the damping means. For example, a bellowed hollow tube can be used, whereby the bellows confer elastomeric compressibility on the damping means.

In addition to the described elastomeric properties, it is preferred that the damping means have a hysteresis less than 40%, preferably less than 30% and more preferably less than 10%. By "hysteresis", is meant the loss of energy between a compression and relaxation cycle of the damping means after at least 3 cycles at 23° C. and at a compression speed of 50 mm/min. Such a hysteresis is governed not only by the characteristics of the elastomeric material but also by the design of the damping means.

In general, low hysteresis is desired to ensure that the energy lost per cycle from the elastomeric material is lower than the energy gained per cycle from the relative motion. In some designs, it may be desirable to increase the hysteresis to allow for extreme damping, for example when the relative motion of the members is close to the maximum allowed motion, and energy loss needs to be greater than energy gain.

More preferably the damping means is made from a polymer or polymer blend comprising:
a copolyester thermoplastic elastomer (TPC) such as a copolyetherester or copolyesterester, which are copolymers that have a multiplicity of recurring long-chain ester units and short-chain ester units joined head-to-tail through ester linkages, said long-chain ester units being represented by formula (A):

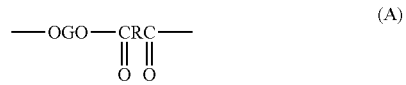

(A)

and said short-chain ester units being represented by formula (B):

(B)

wherein:

G is a divalent radical remaining after the removal of terminal hydroxyl groups from poly(alkylene oxide)glycols having preferably a number average molecular weight of between about 400 and about 6000;

R is a divalent radical remaining after removal of carboxyl groups from a dicarboxylic acid having a molecular weight of less than about 300; and D is a divalent radical remaining after removal of hydroxyl groups from a diol having a molecular weight preferably less than about 250; and wherein said copolyetherester(s) preferably contain from about 15 to about 99 wt-% short-chain ester units and about 1 to about 85 wt-% long-chain ester units.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly(propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

The term "short-chain ester units" as applied to units in a polymer chain of the copolyetheresters refers to low molecular weight compounds or polymer chain units. They are made by reacting a low molecular weight diol or a mixture of diols with a dicarboxylic acid to form ester units represented by Formula (B) above. Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol.

Copolyetheresters that can advantageously be used for the manufacture of the damping means of the present invention are commercially available from E. I. du Pont de Nemours and Company, Wilmington, Del., under the trademark Hytrel®.

In another preferred embodiment, the damping means is made from a thermoplastic vulcanizate (TPV). A TPV consists of a continuous thermoplastic phase with a phase of vulcanized elastomer dispersed therein. Vulcanizate and the phrase "vulcanizate rubber" as used herein are intended to be generic to the cured or partially cured, cross-linked or cross-linkable rubber as well as curable precursors of cross-linked rubber and as such include elastomers, gum rubbers and so-called soft vulcanizates. TPVs combine many desirable characteristics of cross-linked rubbers with some characteristics like processability of thermoplastic elastomers. There are several commercially available TPVs, for example Santoprene® and Sarlink® (TPV's based on ethylene-propylene-diene copolymer and polypropylene) which are respectively commercially available from Advanced Elastomer System's and DSM; Nextrile™ (TPV based on nitrile rubber and polypropylene) which is commercially available from Thermoplastic Rubber Systems; Zeotherm® (TPV based on acrylate elastomer and polyamide) which is commercially available from Zeon Chemicals; and DuPont™ ETPV from E. I. du Pont de Nemours and Company, which is described in WO 2004029155 (thermoplastic blends comprising from 15 to 60 wt-% of polyalkylene phthalate polyester polymer or copolymer and from 40 to 85 wt % of a cross-linkable poly(meth)acrylate or polyethylene/(meth)acrylate rubber dispersed phase, wherein the rubber is dynamically cross-linked with a peroxide free radical initiator and an organic diene co-agent).

In another preferred embodiment, the damping means is made from a thermoplastic polyolefinic elastomer (TPO) consisting of olefin type, like for example propylene or polyethylene, with a rubber. Common rubbers include EPR (ethylene-propylene rubber), EPDM (ethylene propylene diene rubber), ethylene-hexane, ethylene-octene (like for example Engage® which is commercially available from Dow) and ethylene-butadiene.

In another preferred embodiment, the damping means is made from a styrenic thermoplastic elastomer (TPS) consisting of block copolymers of polystyrene and rubbery polymeric materials like for example polybutadiene, a mixture of hydrogenated polybutadiene and polybutadiene, poly(ethylene-propylene) and hydrogenated polyisoprene.

In another preferred embodiment, the damping means is made from a thermoplastic polyurethane (TPU) consisting of a linear segmented block copolymer composed of hard segment comprising a diisocyanate and a short chain glycol and soft segments comprising diisocyanate and a long chain polyol as represented by the general formula

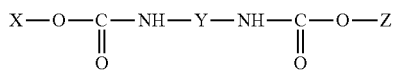

wherein:
"X" represents a hard segment comprising a diisocyanate and a short-chain glycol, "Z" represents a soft segment comprising a diisocyanate and a long-chain polyol and "Y" represents the residual group of the diisocyanate compound of the urethane bond linking the X and Z segments. The long-chain polyol includes those of a polyether type such as poly(alkylene oxide)glycol or those of polyester type.

Thermoplastic polyamide block copolymers (TPA's) consist of linear and regular chain of polyamide segments and flexible polyether or polyester segments or soft segment with both ether and ester linkages as represented by the general formula

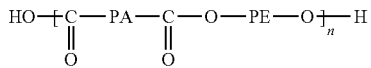

wherein:
"PA" represents a linear saturated aliphatic polyamide sequence and "PE" represents for example a polyoxyalkylene sequence formed from linear or branched aliphatic polyoxyalkylene glycols or a long-chain polyol with either ether or ester or both linkages and mixtures thereof or copolyethers copolyesters derived therefrom. The softness of the copolyetheramide or the copolyesteramide block copolymer generally decreases as the relative amount of polyamide units is increased.

Suitable examples of thermoplastic polyamide block copolymers for use in the present invention are commercially available from Arkema or Elf Atochem under the trademark Pebax®.

Thermoset and elastomeric materials like cross-linked rubbers such as natural rubber, styrene butadiene rubber, neoprene CR, EPDM (ethylene propylene diene monomer), HNBR (hydrogenated nitrile butadiene rubber), NBR (nitrile butadiene rubber), ACM, AEM, EVA, CM, CSM, CO, may also be used.

The damping means may be made by any means for forming elastomeric articles, for example: injection molding, blow molding (including injection blow-molding), and extrusion (particularly corrugated extrusion). Based on the geometry and size of the damping means, the productivity and tolerance requirements, extrusion is a suitable technique and in particular corrugated extrusion, which permitted the easy and cost-effective manufacture of hollow tubes having convolutes.

A suitable material for the damping means is a thermoplastic elastomer. In a preferred embodiment, the damping means is made of thermoplastic elastomer having an apparent melt viscosity higher than 150 Pa·s measured according to ISO 11443:2005(E) under a shear rate of 1000 s−1 and at a processing temperature at or about 30° C. above the polymer melting point. Such materials are preferred because they can be used for extrusion, injection molding and blow molding.

For blow molding, preferred materials are thermoplastic elastomers having an apparent melt viscosity higher than 275 Pa·s. For extrusion methods, preferred materials are thermoplastic elastomers having an apparent melt viscosity higher than 180 Pa·s. For injection molding, preferred materials are thermoplastic elastomers having an apparent melt viscosity higher than 80 Pa·s. Apparent melt viscosities are measured according to ISO 11443:2005(E) under a shear rate of 1000 s−1 and at a processing temperature at or about 30° C. above the polymer melting point.

The damping means is connectable to the second member and to the first member of the WEC device. The connection may be direct or indirect.

The damping means should preferably have a tailored non-linear stress-strain response designed to meet the specific requirements of the members and the forces to which they will be subjected. That is, the counterforce exerted by the damping means is non-linearly related to the force applied thereto and to the rate of application of such force. Furthermore the exact non-linear response needs to be tailored based on the required relative motion and force of the members. In the present invention, movement of the first member in response to wave motion exerts a force on the damping means. The counterforce exerted on the first member by the damping means is non-linearly related to the applied force and the rate of application of that force. The damping means of the present invention exhibits a reversible non-linear stress-strain response by compressing in response to the applied force and returning to its original form when the force is removed with minimum hysteresis to give the maximum energy to optimise the output of the system. The damping means can be modified in its design to allow for exact shape of the non-linear response to be tailored as required.

For example, in a hollow cylindrical damping means, it is possible to tailor the response of the damping means by varying the wall thickness of the damping means (FIG. 7, T), varying the ratio of the diameter of the peaks to the diameter of the valleys by means of varying the diameter/radius of the peaks (FIG. 7, Rext) and diameter/radius of the valleys (FIG. 7, Rint), by varying the number of bellows/convolutes, by varying the pitch (FIG. 7, P) or by varying the fillet radius at minimum outer diameter of bellows (FIG. 7, rc) and the fillet radius at maximum outer diameter of bellows (FIG. 2, rs). The response of the damping means can also be tailored by choice of material.

Preferably, the damping means exerts a low (or zero) counterforce until the applied force or rate of applied force exceeds a threshold, above which the counter force exerted increases sharply as the applied force increases. An example of such a response is shown in FIG. 1, where F2 is the applied force, and F1 is the counter force exerted by the damping means. Region A of FIG. 1 shows the ideal response under normal wave conditions, region B shows the ideal response under extreme conditions, and region C shows the ideal response when the conditions become so extreme that a protective function is necessary. The boundary points between regions are preferably tailored based on the design of the members and the expected applied forces. The threshold value between region A and region B is tailored such that the counter force increases sharply when the applied force approaches a level at which damage to the WEC would otherwise be likely to occur. It is preferred that such an increase is not so rapid as to lead to high shock or impulse forces in the members, but is sharp enough to ensure that at the second threshold point, between region B and region C, the applied force is equal to or greater than the expected maximum relative force between the members. High impulse forces may be a cause for failure in conventional WEC devices.

In region A, it is desirable to have almost no counter force so that the normal operation of the device is not affected or any energy lost in the elastomeric material. One way to achieve low counter forces in region A is to design the damping means such that there is a range of relative motion between the first and the second member for which the damping means is not engaged, e.g. by provision of a non-engaged space at either or both ends of the damping means, between the end of the damping means and the body against which it acts, such as the first and second members. This permits unhindered relative motion of the first and second members within a limited range. Once this range is exceeded (e.g. in high sea states), the ends of the damping means are engaged, and compressive damping begins, Region B. A non-limiting example of this kind of arrangement is shown in the context of one embodiment of the invention, in FIG. 3, where 10a and 10b denote free spaces at the ends of the damping means 7a and 7b respectively. During initial relative movement of the first and second members, the damping means 7a and 7b are not engaged, because they do not abut against the housings or envelopes 9a and 9b, respectively. If the relative movement becomes more extreme, damping means 7a and 7b will abut against the envelopes 9a and 9b, respectively, and compressive damping will be engaged.

The damping means may be protected by encasing it in a housing or envelope. The housing or envelope may provide the non-engaged space. Such a housing or envelope may also be used to allow for the damping means to be used in a tensile arrangement, with opposite ends of the housing or envelope being pulled towards each other.

A plurality of damping means may be provided, wherein each damping means is arranged to damp the movement of the WEC substantially along one axis only. The damping means may also be used in conjunction with tensile damping members, i.e. damping means that act under traction. The alignment and/or design of each damping means may allow the damper or damping structure to provide different stress-strain responses along different axes. It is desirable to have a damping means aligned to respond to at least one of, and desirably all of heave (vertical), pitch (rotational) and surge (lateral) forces.

In a preferred embodiment for a vertical point absorber type device (one whose energy is captured from the relative vertical motion), a damping means, arranged to damp surge (lateral) forces, is used to limit the maximum lateral response of the device. The damping means is appropriately positioned or aligned so that its damping effect is applied, as far as possible, to surge forces. A further damping means, arranged to damp heave (vertical) forces (between components of the WEC device), may be used to limit the maximum vertical extension of the device. Similarly, this damping means is positioned or aligned so that its damping effect is applied to heave forces. Independent control over the separate forces acting on the device allows the overall response of the damping structure to be more accurately tailored to the conditions in order to protect the device and maximise energy capture.

The present invention provides several advantages over known WEC devices. The nature of the damping structure provides enhanced structural stability and resilience which prevents breakage of the WEC device by extreme waves.

The structure also provides more efficient energy capture. Ocean waves are never single frequency and always comprise higher frequency components in addition to the main frequency component. The main frequency component changes with sea state and some devices can adjust their response to tune to this frequency, but few WEC devices are capable of reacting quickly enough to capture the energy from higher frequency wave components within a single sea state. The damping means is capable of reacting to the higher frequency components of the waves, thereby allowing the WEC device to capture energy from the higher frequency components of the waves. Furthermore by tailoring the non-linear response and allowing the WEC to withstand extreme wave scenarios, the WEC can actually be operated in rougher seas, increasing the number of wave states over which the device captures energy and overall energy capture.

The present invention also provides an additional advantage over current WEC devices. The damping means desirably applies counter forces having both lateral and vertical components and thus automatically acts to straighten the first member, thus maintaining an optimal alignment to the waves when in use, that is, generally perpendicular to the direction of travel of the waves. This reduces the risk of damage to the coupling system of the WEC device caused by stress from angular differences between the first and second members of the WEC device.

In a preferred embodiment the elastomeric material is tailored and manufactured as a component for insertion between two members of any WEC device, granting that device the enhanced performance characteristics of the invention.

In a preferred embodiment, the second member is a substantially rigid ring adapted for arrangement substantially concentrically around the first member (less inert member) of the wave energy conversion device. The ring may be any suitable shape including circular, square, rectangular or any other polygonal shape.

The second member may comprise a plurality of linked segments. Alternatively, the second member may comprise at least one other WEC device. Several WEC devices may be interconnected to form a raft-like structure. The devices may be linked by a second member, which may be substantially rigid. Alternatively, the devices may be linked by a damping member.

The size and profile of the second member are selected to maximise the relative motion between the members. When the first member of the WEC device is at the highest point of the wave, it is desirable that the angle formed between the second member and the first member is less than about 45 degrees. This maximises the vertical component of the force applied to the first member while providing sufficient horizontal counterforce to counteract lateral surge forces.

For a single, unconnected WEC device, the second member is preferably a ring having a relatively large diameter to ensure that there is significant relative movement between the first member of the WEC device and the ring. For example, for a device in wave conditions where the height variation of the wave is between 5 and 8 meters, a suitable ring diameter is between 10 and 20 meters greater than the first member. In general, the size of the ring will be based on the height of the waves. The size of the ring may be selected to ensure a balance between a large vertical component of the counter force (smaller ring) to limit heave as well as sufficient lateral force to correct surge (larger ring).

For a plurality of interconnected WEC devices, it is necessary to balance the requirement for a small ring diameter to achieve the required angle with the requirement for a larger ring diameter to avoid interaction between the ring and the float and to correct heave.

Preferably, size and shape of the second member are selected such that it floats just below the surface of the ocean. In one embodiment, the second member is a ring arranged to float approximately 3 meters below the point where the first member of the WEC device sits in the water.

DETAILED DESCRIPTION OF THE DRAWINGS

The damping means of the present invention is equally applicable to several types of WEC devices. We describe some of these WEC devices in which the damping means of the present invention can be used.

Figure 3:
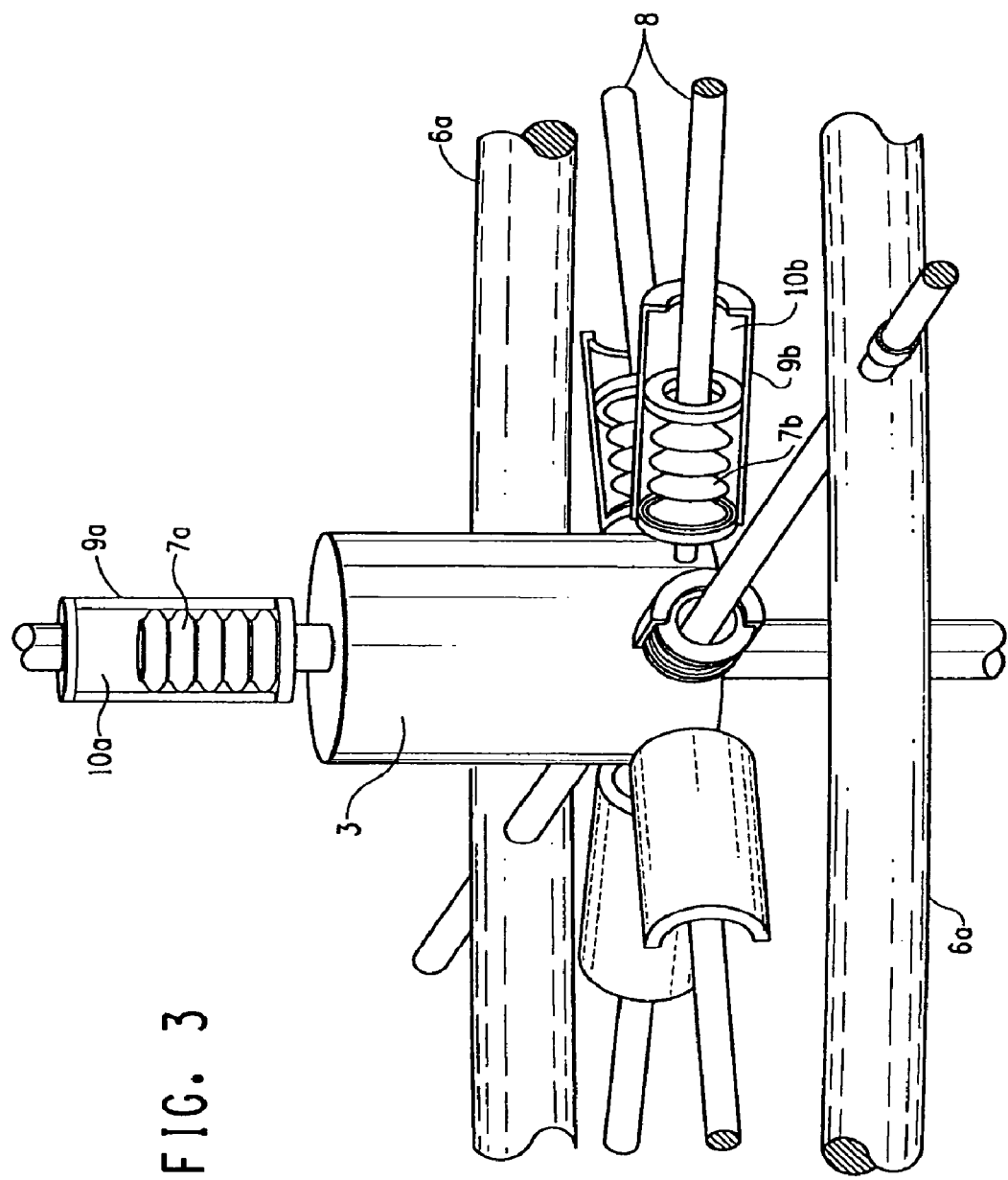
FIG. 3 is a detail of the damping means illustrated in FIG. 2.

Referring to FIGS. 2 and 3 of the drawings, there is illustrated an embodiment of the WEC device 1 of the point absorber type, comprising a damping structure 2 according to the present invention. This type of WEC device converts energy from the vertical movement of the ocean surface during wave conditions into electrical energy. The damping means of the present invention is equally applicable to other types of WEC device.

In FIG. 2, the wavy line depicts the surface of the water. The device 1 comprises a first member 3 and a second member 4, that have different responses to wave motion. Energy is extracted from the relative movement of the two members. The members have different wave responses due to different shapes, densities and/or masses.

Alternatively, the second member 4 may be anchored or tethered for example to the sea-bed. In use, the second member 4 is submerged beneath the surface of the ocean. The buoyancy of the first member 3 is chosen such that it floats on or near the surface of the ocean. A linkage or coupling 5 is provided between the first member 3 and the second member 4. The linkage 5 comprises a power take off device to convert relative motion between the first member 3 and the second member 4 into electrical energy. The power take-off device may be, for example, a linear electric generator.

The damping structure 2 comprises a stabilising member 6 (6a and 6b) and a damping means 7 (7a and 7b). The stabilising member 6 is an inverted basket-shaped structure comprising a substantially rigid outer ring 6a arranged substantially concentrically around the first member 3 of the device 1, and a substantially rigid half ring 6b attached at either end to the outer ring 6a and passing over the first member 3. The damping means 7a and 7b are cylindrical bellowed elastomeric member which act under compression in the axial direction (i.e. the direction designated in FIG. 2 with a double-ended arrow). The stabilising member 6 is connected to the damping means 7a and 7b by means of connecting members 8, which in this case take the form of rigid rods.

Generally, the damping means are oriented vertically, and/or laterally and radially to deal with the heave motions of the waves.

In use, the device is arranged such that the second member 4 is submerged beneath the surface of the ocean. The first member 3 is arranged such that it floats on or near the surface of the ocean. As a wave approaches the device 1, the buoyancy of the first member causes it to move upwards with the surface of the water. The second member 4 is resistant to wave motion and therefore remains relatively stationary. The first member 3 therefore moves relative to the second member 4. A power take off device converts this relative motion to electrical energy. As the wave passes the device 1, the first member 3 moves down-wards relative to the second member 4. The power take off device also converts this relative motion to electrical energy.

The movement of the first member 3 in each case exerts a force on the damping structure 2. The ring 6a is substantially resistant to wave motion and therefore remains relatively stationary. When a wave passes the device 1, the upward movement of the first member 3 exerts an upward heave force on the damping means 7a when a chosen degree of displacement is reached. The forward motion of the wave also exerts a lateral surge force on the WEC, which is modulated by damping means 7b. The angular force is also controlled by the same damping member, to avoid the relative rotation of the two members.

Figure 4:
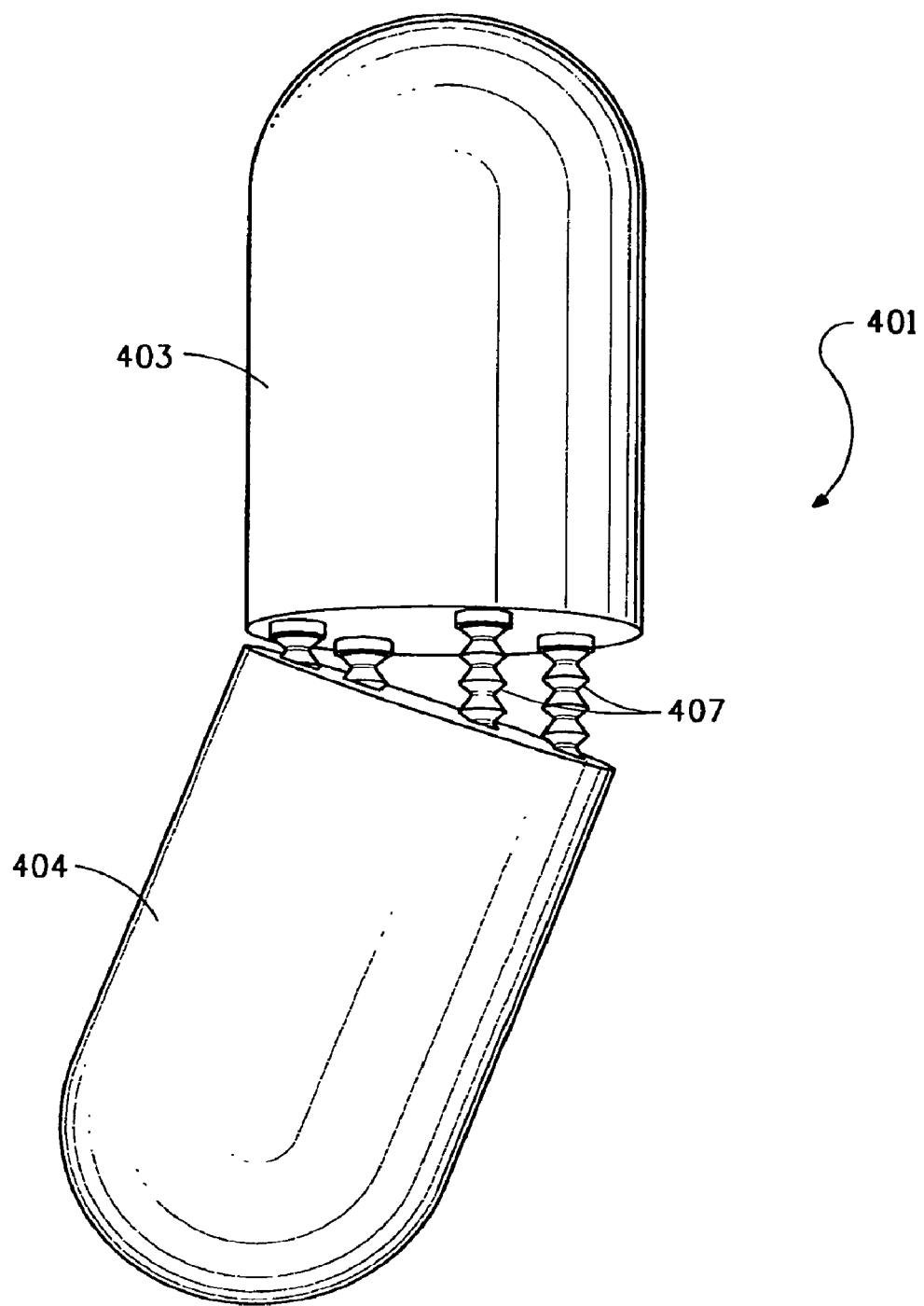
FIG. 4 is a depiction of the wave energy conversion device according to another embodiment of the invention.

As shown in FIG. 4, there is a free space 10 (10a and 10b) at one end of the damping members 7a and 7b. This permits a degree of relative motion between the first member 3 and the second member 4 before the compressive action of the damping means 7a and 7b is engaged. This permits unhindered relative motion of the first member 3 and the second members 4 within a defined range as shown in region A of FIG. 1.

The bellowed structure of damping means 7a and 7b and the fact that they are made from elastomeric material permits the damping counterforce to increase non-linearly with respect to both the applied force and the rate of change of the applied force. For normal waves, the damping counterforce is very low, and the movement of the float 3 in response to the wave is not substantially affected. However, when the force applied (or the rate of change of the applied force) exceeds a threshold, for example, in the case of an extreme wave, the damping counterforce is much higher, thereby preventing extreme movement of the first member 3. The damping means thereby prevent breakage of the linkage 5 between the first member 3 and the second member 4.

The damping structure 2 also provides more efficient energy capture since the damping means 7a and 7b are capable of reacting to the higher frequency components of incident waves, thereby allowing the WEC device to capture energy from the higher frequency components of the waves. It allows also capturing energy from high sea states at which previous system were stopped or damaged.

Furthermore, since the damping means 7a and 7b apply counter forces having both lateral and vertical components, they act to straighten the first member 3. This prevents the WEC device 1 from resting in a tilted position or orientation in the ocean, thus maintaining an optimal alignment to the waves and maximising the vertical displacement that is used to convert energy. This reduces the risk of damage to the coupling system 5 of the WEC device 1 caused by stress from angular differences between the first member 3 and second member 4 of the WEC device.

FIG. 3 shows a detail of FIG. 2, showing damping means 7b where they abut the first member 3. Since the first member 3 moves up and down with respect to damping means 7b, the damping means may be connected to first member 3 by means of an articulation. In this case, rods 8 should be attached to outer ring 6a in an articulated manner. Alternatively, damping means 7b may simply abut first member 3 such that first member 3 can move freely up and down, sliding past the ends of damping means 7b. To protect damping means 7a and 7b, they may be encased in a protective housing or envelope 9 (9a and 9b).

As mentioned before, protective envelope 9 (9a and 9b) may have a free-space 10 (10a and 10b), which permits free relative motion of the first member 3 and second member 4 for low sea states.

Referring to FIG. 4, in another preferred embodiment, the WEC 401 is of the "worm" type, in which the first 403 and second 404 members are elongated bodies which both float at the surface of the water and which are coupled end-to end (an attenuator type device). A wave will cause relative motion between the first and second members because the two members will rise and fall at different times. Damping means 407 are cylindrical bellowed elastomeric tubes which under compression damp the wave force limiting the displacement of the two members one versus the other. Hinges can be used to control the allowed rotational axis between the bodies if desired.

Figure 5:
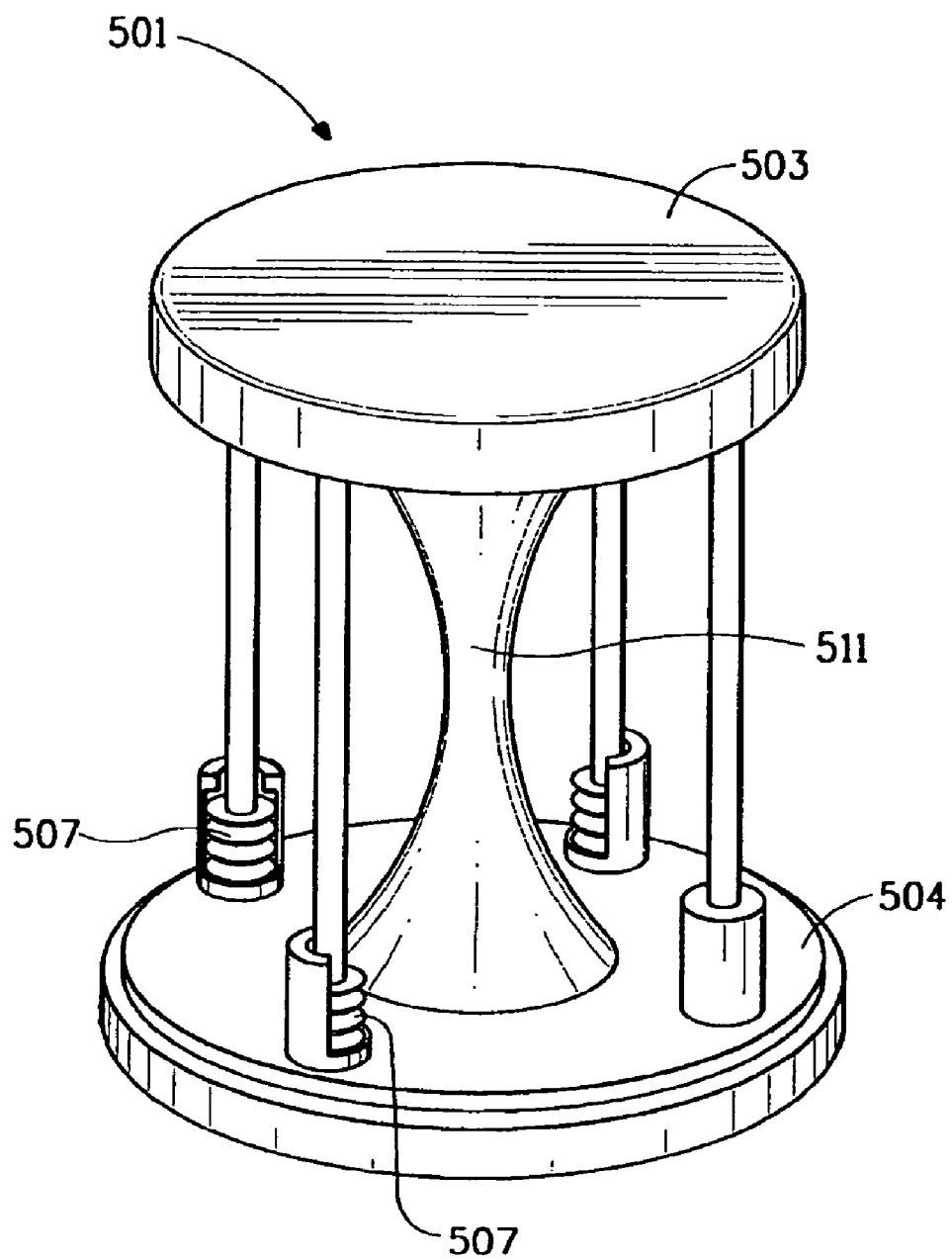
FIG. 5 is a depiction of the wave energy conversion device according to yet another embodiment of the invention.

Referring to FIG. 5, in another preferred embodiment, the WEC device 501 comprises an upper member 503 and a lower member 504. The upper and lower members 503 and 504 are connected by means of a flexible tube 511. The upper and lower members move relative to one another when waves are incident on the device 501. Assuming that the member 504 is anchored at the sea bed or fixed to an external structure, the float 501 will have its own movement due to the wave motion and the damping system 507 is used in case of extreme wave to limit the displacement of the float 501 and protect the flexible tube 511. The relative motion alternately compresses and relaxes the tube, pumping water therethrough. The pumped water is used to capture energy from the device.

The devices illustrated in FIGS. 2 to 5 are intended only to illustrate the way in which the damping means work. Many other configurations between the first member and the second member are possible. As long as the damping means is a cylindrical bellowed elastomeric member which acts under compression, the WEC is encompassed by the invention.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The Examples below describe the invention in further detail and set forth a preferred mode presently contemplated for carrying out the invention and are intended to illustrate but not limit the invention.

EXAMPLES

A damping means was made by corrugated extrusion to have the following dimensions: P=6 mm, Rext=29 mm, T=1.2 mm, rc=0.5 mm, rs=1.8 mm (defined in terms of FIGS. 6 and 7). The material used was a copolyetherester having PBT hard segments and poly(tetramethylene diol) soft segments. The copolyetherester had the following physical/chemical characteristics:

(a) elongation at break higher than 50%, measured according ISO 527-1/-2 with a specimen type 1A, a speed of testing of 5 mm/min, an ambient temperature of 23° C. and a relative humidity of 50%;

(b) tensile stress at yield of 10 MPa, measured according ISO 527-1/-2 with a specimen type 1A, a speed of testing of 5 mm/min, an ambient temperature of 23° C. and a relative humidity of 50%;

(c) tensile modulus of elasticity of 150 MPa, measured according ISO 527-1/-2 with a specimen type 1A, a speed of testing of 5 mm/min, an ambient temperature of 23° C. and a relative humidity of 50%.

The damping means was assembled in a 1/60th scale model in a similar way to the type shown in FIGS. 2 and 3, adding a paired tensile string system. The device was subjected to waves in a wave tank at the Hydraulic and Maritime Research Centre in Cork, Ireland (HMRC). Load cells were used to measure the different forces.

This system successfully removed surge and pitch by using eight compressive damping means kept in a perpendicular alignment to ensure that the compressive string are not effected by the heave motion. The results showed that the structure successfully removed surge and pitch forces through the use of a corrugated compressive elastomeric damping means.

What is claimed is:

1. A wave energy conversion device comprising:
   (a) a first member capable of movement in response to a wave;
   (b) a second member capable of relative motion with respect to the first member under the influence of a wave;
   (c) a linkage comprising a power take-off device and connecting the first member to the second member and;
   (d) a stabilizing member comprising
      a substantially rigid outer ring arranged substantially concentrically around the first member, and
      a substantially rigid half ring attached at either end to the outer ring and passing over the first member;
   (e) at least one damping means capable of damping the relative motion between the first member and the second member under conditions of extreme waves;
   (f) at least one connecting member connecting the stabilizing member to the damping means;
   wherein the damping means is a cylindrical bellowed elastomeric member which acts under axial compression; and
   wherein the apparatus converts the relative motion of the first member and the second member into electrical energy.

2. The wave energy conversion device of claim 1, wherein the damping means is hollow.

3. The wave energy conversion device of claim 1, wherein the damping means is a hollow cylinder having bellows in its side walls.

4. The wave energy conversion device of claim 1 or 2, wherein the damping means is made of an elastomeric material that is a thermoplastic material having the following characteristics in use:
   (a) an elongation at break, measured according to ISO 527-1/-2, higher than 15% between −20° C. and +60° C.,
   (b) a tensile stress at yield, measured according ISO 527-1/-2, between 5 and 100 MPa, and
   (c) a tensile modulus of elasticity, measured according ISO 527-1/-2, below 20000 MPa.

5. The wave energy conversion device of claim 1 or 2, wherein the damping means is made of a copolyetherester or copolyesterester, which are copolymers that have a multiplicity of recurring long-chain ester units and short-chain ester units joined head-to-tail through ester linkages, said long-chain ester units being represented by formula (A):

and said short-chain ester units being represented by formula (B):

wherein:

G is a divalent radical remaining after the removal of terminal hydroxyl groups from poly(alkylene oxide)glycols having preferably a number average molecular weight of between about 400 and about 6000;

R is a divalent radical remaining after removal of carboxyl groups from a dicarboxylic acid having a molecular weight of less than about 300; and D is a divalent radical remaining after removal of hydroxyl groups from a diol having a molecular weight preferably less than about 250; and wherein said copolyetherester(s) preferably contain(s) from about 15 to about 99 wt-% short-chain ester units and about 1 to about 85 wt-% long-chain ester units.

6. The wave energy conversion device of claim 1 or 2, wherein the damping means is made from a thermoplastic polyurethane consisting of a linear segmented block copolymer composed of a hard segment comprising a first diisocyanate and a short chain glycol, and a soft segment comprising a second diisocyanate and a long chain polyol, as represented by formula (C):

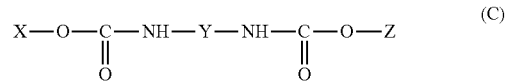

wherein:

X represents the hard segment comprising the first diisocyanate and a short-chain glycol;

Z represents the soft segment comprising the second diisocyanate and the long-chain polyol; and Y represents the residual group of the diisocyanate compound of the urethane bond linking the X and Z segments.

7. The wave energy conversion device of claim 1 or 2, wherein the damping means is made from a thermoplastic polyamide block copolymers consisting of linear saturated aliphatic polyamide segments and flexible polyether or polyester soft segment with both ether and ester linkages as represented by the general formula (D):

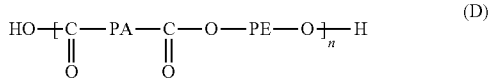 (D)

wherein:

PA represents a linear saturated aliphatic polyamide sequence; and

PE represents a polyoxyalkylene sequence formed from a moiety selected from the group consisting of linear aliphatic polyoxyalkylene glycols with ether, linkages, polyoxyalkylene glycols with ester linkages, polyoxyalkylene glycols with ether and ester linkages, branched polyoxyalkylene glycols with ether linkages, branched polyoxyalkylene glycols with ester linkages, branched polyoxyalkylene glycols with ether and ester linkages, long-chain polyol with ether linkages, long-chain polyol with ester linkages, long-chain polyol with ether and ester linkages, mixtures thereof, copolyethers derived therefrom, and copolyesters derived therefrom.

8. The wave energy conversion device of claim 1 or 2, wherein the damping means is made from a thermoplastic vulcanizate.

9. The wave energy conversion device of claim 1 or 2, wherein the damping means is made from a thermoplastic polyolefinic elastomer.

10. The wave energy conversion device of claim 1 or 2, wherein the damping means is made from a styrenic thermoplastic elastomer (TPS).

11. The wave energy conversion device of claim 1, wherein the device further comprises a non-engaged space at one or both ends of the damping means, whereby the damping means is not engaged within a limited range of relative motion of the first and second members.

12. The wave energy conversion device of claim 1, wherein the damping means is protected in a housing, and wherein the housing provides a non-engaged space, whereby the damping means is not engaged within a limited range of relative motion of the first and second members.

* * * * *